US007047302B1

(12) United States Patent
Chatani et al.

(10) Patent No.: US 7,047,302 B1
(45) Date of Patent: May 16, 2006

(54) METHOD AND SYSTEM FOR ENABLING OPTIONAL CUSTOMER ELECTION OF AUXILIARY CONTENT PROVIDED ON DETACHABLE LOCAL STORAGE MEDIA DURING ACCESS OF PRIMARY CONTENT OVER A NETWORK AND FOR COLLECTING DATA CONCERNING VIEWED AUXILIARY CONTENT

(75) Inventors: Masayuki Chatani, Foster City, CA (US); Andrew James House, Foster City, CA (US)

(73) Assignee: Sony Corporation Entertainment America Inc., Foster City, CA (US)

( * ) Notice: Subject to any disclaimer, the term of this patent is extended or adjusted under 35 U.S.C. 154(b) by 0 days.

(21) Appl. No.: 09/452,811

(22) Filed: Dec. 2, 1999

(51) Int. Cl.
*G96F 15/16* (2006.01)
(52) U.S. Cl. ......................................... 709/229; 705/14
(58) Field of Classification Search ........ 709/217–219, 709/201, 203, 229; 705/14, 50, 51–56; 463/40
See application file for complete search history.

(56) References Cited

U.S. PATENT DOCUMENTS

| | | | |
|---|---|---|---|
| 5,233,423 A | 8/1993 | Jernigan et al. ............. 358/181 |
| 5,532,735 A | 7/1996 | Blahut et al. .................. 348/13 |
| 5,740,549 A | 4/1998 | Reilly et al. ................... 705/14 |
| 5,838,314 A | 11/1998 | Neel et al. .................... 345/327 |
| 5,913,040 A | 6/1999 | Rakavy et al. ......... 395/200.62 |
| 5,937,158 A * | 8/1999 | Uranaka ..................... 713/200 |
| 5,937,164 A * | 8/1999 | Mages et al. ................ 709/218 |
| 6,026,368 A | 2/2000 | Brown et al. .................. 705/14 |

(Continued)

FOREIGN PATENT DOCUMENTS

JP          10-275114          10/1998

(Continued)

OTHER PUBLICATIONS

M. Chatani, "Method and System for Providing Auxiliary Content Located on Local Storage During Download/Access of Primary Content Over A Network", U.S. Appl. No. 09/771,751, filed Jan. 29, 2001.

*Primary Examiner*—Dung C. Dinh
(74) *Attorney, Agent, or Firm*—Martine Penilla & Gencarella, LLP

(57) ABSTRACT

Interactive or non-interactive primary content for which value is expected to be paid, is maintained in a contents database and accessed from a server station over a network. A customer database containing identifying information about persons accessing the system is maintained on the server side. When the customer accesses the server system over a network, the desired primary content is downloaded into the game console together with accessing identifying information about the client from the customer database. On the basis of the identifying information, auxiliary content, such as advertisements, is triggered for playback in the game console. Information concerning viewing of the auxiliary content is recorded and uploaded to the server. The playback record of the auxiliary content is used as a basis for billing the client and advertisers for valuable content. The auxiliary content is provided on a detachable storage medium such as a CD-ROM or a DVD.

32 Claims, 6 Drawing Sheets

U.S. PATENT DOCUMENTS

| | | | |
|---|---|---|---|
| 6,049,823 A | 4/2000 | Hwang | 709/218 |
| 6,101,534 A * | 8/2000 | Rothschild | 709/217 |
| 6,108,637 A | 8/2000 | Blumenau | 705/7 |
| 6,195,693 B1 * | 2/2001 | Berry et al. | 709/219 |
| 6,279,036 B1 * | 8/2001 | Himmel et al. | 709/224 |
| 6,314,451 B1 | 11/2001 | Landsman et al. | |
| 6,400,996 B1 * | 6/2002 | Hoffberg et al. | 700/83 |
| 6,405,214 B1 * | 6/2002 | Meade, II | 707/104.1 |
| 6,453,420 B1 * | 9/2002 | Collart | 713/201 |

FOREIGN PATENT DOCUMENTS

| | | |
|---|---|---|
| JP | 2000-137721 | 5/2000 |

\* cited by examiner

METHOD AND SYSTEM FOR ENABLING OPTIONAL CUSTOMER ELECTION OF AUXILIARY CONTENT PROVIDED ON DETACHABLE LOCAL STORAGE MEDIA DURING ACCESS OF PRIMARY CONTENT OVER A NETWORK AND FOR COLLECTING DATA CONCERNING VIEWED AUXILIARY CONTENT

BACKGROUND OF THE INVENTION

1. Field of the Invention

The present invention relates to systems for engaging in interactive entertainment or for accessing non-interactive entertainment using a networked game console connected to a content provider over a bi-directional network, and more specifically to maintenance and accessing of customer and content databases which support such systems, for enabling playback of both valuable primary content along with auxiliary content such as targeted advertisements.

2. Description of the Related Art

In recent years, improvements in the ability for members of the public to access valuable media and entertainment content by connection to relatively low cost high speed bi-directional networks has raised interest in advertisers seeking to exploit such systems for promotion of goods and services.

One trend has been to offer certain services, such as network access, or access to specialized media content, e-mail accounts, e-fax accounts, and so forth, over a network connection, for free to customers who are willing to sign up and provide detailed personal identifying information to be maintained in a server database. In return for providing such customer information, the service provider provides desired access to services, for example an e-mail account, to the customer for free or at reduced cost, with the provision that the customer must then view attached advertisements, which may be targeted to the customer based on his or her identifying information, browsing activity, etc. Such advertisements can be attached to customer e-mail or appear in pop-up windows or frames which are generated upon accessing the server network. By such systems, the costs necessary for maintaining the network services or paying for network content can be paid for by advertising revenues, whereas the customer gains access to desired services by release of certain personal information and being forced to view targeted commercial advertisements.

However, despite their popularity as an advertising medium, such systems suffer from the drawback that customers, in general, do not like being forced to view commercials. In addition, many customers are reluctant to give up personal information, particularly to advertisers, in exchange for free network services or free access to content over a network. A need exists for customers to exercise choice in whether and when they wish to view auxiliary content. At the same time, flexibility needs to be provided to advertisers in terms of the manner in which such auxiliary content is delivered to customers, so that advertisements can be presented in a non-offending way more likely to appeal to customer interest. Therefore, more flexible systems have been sought in which advertisements can be provided to customers who retain the option of viewing such advertisements or not, with the access fees for network and content services being adjusted based on whether a customer chooses to view the commercials or not.

Interactive television or video systems offering pay-per-view or video-on-demand services, and in which in which valuable content, such as movies in digital MPEG format are downloadable for customer viewing, along with optional advertisements, are known from Blahut et al., U.S. Pat. No. 5,532,735 and Neel et al., U.S. Pat. No. 5,838,314. According to these methods, separate databases are established on the server side, the first containing desired valuable media content such as movies, a second database made up of commercial content, and a third database made up of customer identifying information. Should the customer elect not to view the commercial content, a full fee is assessed, whereas if the customer accepts and views the auxiliary content, accessing of the valuable content at a reduced cost or for free is made possible, in which case the revenues for the valuable content are paid for by advertisers. Although these systems do offer the customer the option of disabling advertisements, with fees to the customer for viewing content being adjusted accordingly, nevertheless such systems require a high investment to advertisers since the advertisers must be responsible for set up and maintenance of the server side advertisement database, either by themselves or through detailed coordination with the main content provider. Clearly, a more flexible and lower cost alternative to advertisers therefore would be desirable.

Other methods by which advertisers are able to get their messages across to viewers have been disclosed by Jernigan et al., U.S. Pat. No. 5,233,423 and Rakavy et al., U.S. Pat. No. 5,913,040.

According to Jernigan et al., embedded commercials may be provided in a memory device installed in a television receiver, the commercials being displayed on a portion of the screen through use of a graphics generator when a control function on the television receiver is activated. Although local storage of advertisements on a programmable read-only memory (PROM) is disclosed, this system places a heavy burden on advertisers who must establish access with the PROM device in some manner through a server network.

According to Rakavy et al., advertisements may be provided over a computer network or on a local storage device such as a CD-ROM and displayed on a local computer. The advertisements displayed on the local computer can be selected based on pre-configured user preference information, such as which types or categories of advertisements a given user may choose to view. According to this system, however, although statistics of which advertisements are viewed are recorded, uploaded to an advertising server and provided to advertisers, there is no fee adjustment based on whether the advertisements are viewed or not, so there is no inducement for customers to view such advertisements. Further, the main feature intended to be accessed by this system is simply the internet as a whole, so there is no linkage or association between predetermined primary content and auxiliary advertising content. There is no suggestion that advertisements are provided on a local detachable storage medium which acts as the means (or key) by which customers gain access to predetermined content servers providing valuable media content such as movies, interactive games, programs, and so forth.

SUMMARY OF THE INVENTION

A general object of the present invention is to provide a system and method whereby advertisements are made available to customers via a detachable local storage medium, such as a DVD or CD-ROM disc, which is intended to be inserted into a game console connected via a bi-directional network to a specified content provider, wherein the game console includes a control function for enabling the auxiliary content such as advertisements to be viewed, at the option of the customer, while the customer accesses valuable media content from a primary content database maintained solely by the content provider.

A further object of the invention is to provide a system and method as described above, wherein viewing of auxiliary data such as advertisements can be disabled by a control function of the game console at any time prior to download or during playback of the primary media data.

A further object of the invention is to provide a system and method as described above, wherein a record is maintained of times and durations for which a customer has elected to view auxiliary content along with viewing of valuable media content, wherein an auxiliary content viewing record is subsequently uploaded to the server station maintained by the content provider and can be used as a basis for assessing advertising fees to an advertiser, as well as updating of the customer database.

A further object of the invention is to provide a system and method as described above, wherein a customer database is maintained in the server station, containing identifying information of users who access the server station, wherein such identifying information is capable of being downloaded into the game console in order to enable only auxiliary content which is customized based on a user's identification profile to be loaded and viewed.

A further object of the invention is to provide key data, which may include a media or customer identifier and an authentication code, on the detachable local storage medium on the client side of the system, whereby the key data is used to authenticate access to a specified server station which provides primary media content, and whereby such primary media content cannot be accessed unless the local storage medium is inserted into the game console.

As a result of the above described objects of the invention, improvements over known advertisement methods can be achieved. As an advertisement medium, by use of a local storage medium such as CD-ROM or DVD, there is no need as in the prior art for advertisers to expend costs for maintenance of a large scale advertisement database on the server side of the system. Therefore, advertisers are afforded great flexibility in preparing their own advertising content on relatively low cost packaged media, where at the same time advertisers can associate their auxiliary content with specified valuable media content downloadable from a main content provider.

Furthermore; the cost and time associated with downloading of large volume auxiliary data are avoided. Because the cost of packaged media such as CD-ROM or DVD is relatively low, advertisers have the advantage of being able to easily distribute such media as inserts in magazines and the like. In addition, because of their ability to hold large scale data, such detachable packaged media have the ability to handle multi-colored animation or lengthy playing of auxiliary content which is highly suitable for advertisements.

A significant advantage of the present invention is the ability for advertisers to associate their auxiliary content with specified highly popular and valuable primary media content such as feature movies, interactive games, popular utility programs and the like, which are downloaded from the main content server. That is, merely by contracting with and following a prescribed format determined by the primary media content provider, advertisers are then able to easily manufacture their own advertisement containing CD-ROM or DVD media discs which are easily distributed to customers. Because of their association with popular and valuable primary media content, customers become highly motivated to use such CD-ROM or DVD media as a means for gaining access to the primary media content.

The above and other objects, features and advantages of the present invention will become apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
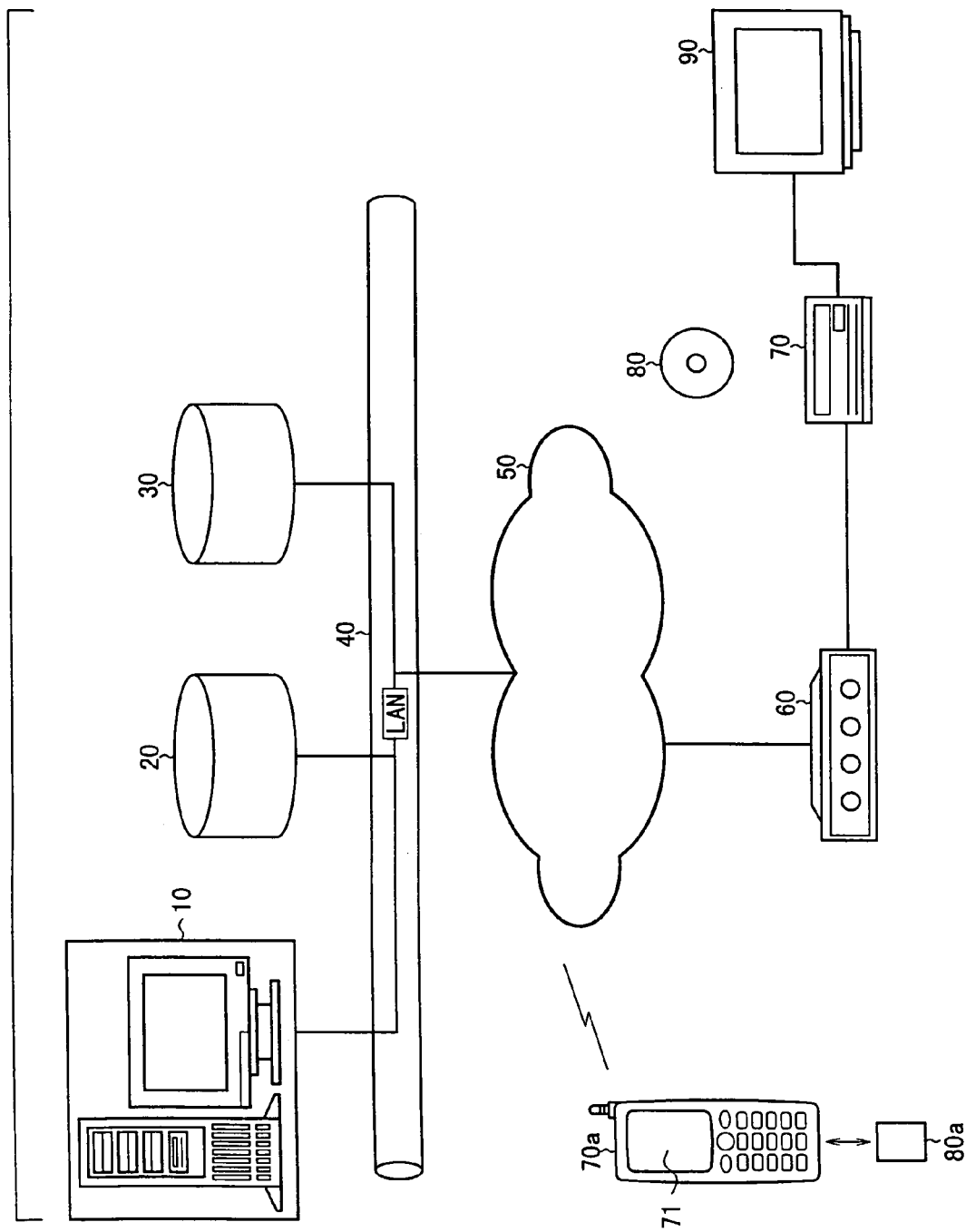
FIG. 1 illustrates an overall system configuration of a system for enabling display of primary media content, along with optional display of locally stored auxiliary media content, according to an embodiment of the present invention.

FIG. 1 shows the configuration of a system for enabling display of primary media content, along with optional display of auxiliary media content, according to an embodiment of the present invention. The term "primary media content" in the context of the specification and claims shall be understood to refer to a collection of downloadable contents which may consist of any one of video linear streaming data, such as a motion picture in the MPEG2 format, linear audio streaming data such as MP3 data, binary program data or any combination of such data. On the other hand, excluded from the definition of "primary media content" are services which are used solely to provide access to a network, for example browser software or protocol handlers whose main function is only to establish a network connection.

As shown in FIG. 1, the system configuration is made up of a server side system comprising a download service management server 10, a customer database 20 and a contents database 30, which are interconnected by a local area network (LAN) 40. The "primary media content" as described in the preceding paragraph is stored in a contents database 30 which makes up part of the server side system. The customer database 20 stores a collection of data about individual customers who access the download service through a bi-directional network 50. The data for individual customers may consist of the customer's name, home address, age, gender, occupation, income, hobbies and interests, information about family members, purchasing history, preference of gender in contents viewed, or any other descriptive information about a user which may be beneficial to advertisers in targeting auxiliary media to customers. Further, such customer data is not static, but is updateable based on a user's access history of the primary contents data, for example data concerning which primary contents are accessed and/or how many times a given category (e.g. type of music, genre of movies, etc.) of primary contents are accessed may be recorded and used for updating the customer data, thereby enabling advertisers to tailor their advertisements more effectively to a given customer.

The download service management server 10 is a server system which is set up to handle download requests from a user. Access to the server 10, which may comprise one of several servers, is facilitated through a typical device known as a router (not shown) on the LAN 40, which directs requests to the download management server 10. When the server 10 receives requests from a user, the server executes a download of requested primary media content from the contents database 30. Along with processing requests for downloading of primary media content, the server 10 also retrieves the requesting user's customer data from the customer database 20 and attaches it with the requested primary contents, which are then transmitted via the network by means of a known networking protocol standard, such as ftp (file transfer protocol).

The network 50 is normally a bi-directional digital communications network that connects the user's terminal hardware with the download service management server 10 provided on the server side of the system. With current technologies, a CATV bi-directional network, ISDN or xDSL high speed networks are examples of existing infrastructures enabling the necessary network connections for implementing the present invention.

The client side of the system configuration comprises a modem or network adapter 60, a networked game console 70 which utilizes a detachable storage medium 80 therein, and a TV monitor or any other suitable display means 90 connected to the game console 70.

More specifically, the modem/network adapter 60 is a typical device used to connect the client's terminal hardware, in this case the game console 70, for hook-up to the network 50. For example, for a CATV network, a known cable modem device may be used, whereas for an ISDN network, a device known as a terminal adapter is used.

The detachable storage media 80 stores a collection of interactive or non-interactive auxiliary content, for example advertisements which may be made up of video images, animations, sounds, applets, etc. In the preferred embodiment, the detachable storage media 80 comprises a CD-ROM or DVD disc. Each item of auxiliary content includes appended "trigger data" which is appended as an access flag to the auxiliary content, as shall be discussed in further detail below.

The networked game console 70 is a network connectable player of interactive digital contents. Such a game console 70, according to conventional methods, normally utilizes the detachable storage media 80 as a contents distribution media in a non-networked environment. Stated otherwise, under ordinary use according to conventional known methods, the game console 70 is capable of playing back media contained on the detachable storage media 80, which normally is an interactive video game for example, even if the game console 70 is not is connected to the network. By contrast, according to the present invention, the storage media 80 is specifically intended to be used in a networked environment and to operate in consort with downloaded primary content retrieved through a network connection, in order to provide linked or associated user-customized auxiliary content.

The network game console 70 executes therein network access software which is to be loaded from the storage media 80 or other internal storage medium (not shown), or which may be downloaded from the network, into an internal operating RAM (also not shown), for performing the following operations:

1. Communicating with the download service management server 10;
2. Sending media or user identification data to the server in order to retrieve downloadable primary content from the contents database 30 together with user information from the customer database 20;
3. Accessing auxiliary content stored in the storage media 80 on the basis of user information downloaded from the server;
4. Enabling the user to selectively override the playback of auxiliary content for viewing solely the primary content downloaded from the server;
5. Recording a history of the auxiliary content items loaded and played back from the storage media 80 at the election of the user; and
6. Sending or uploading the record of viewed auxiliary content items to the download service management server 10.

Under operation, the console 70 receives downloaded primary content together with attached user information, wherein the downloaded primary content may be stored locally on an internal storage media such as a hard disk drive HDD (not shown) or an externally attached re-writable storage medium (not shown) which attaches to the game console 70 through a port connection. The access software first checks, in accordance with feature 4 above, whether or not the user has elected to disable viewing of auxiliary content or not. If the user has not disabled viewing of auxiliary content, the console then accesses and loads one or more interactive or non-interactive contents which match the downloaded user information and/or the downloaded primary content. More specifically, a comparison is made between the user information and "trigger data" contained as a header with each piece of auxiliary content, and if data contained in the trigger data match with the user information, the auxiliary content item is then loaded and queued for playback in the console 70. In addition, a given request for specified primary content may also spawn the loading and queuing of auxiliary content. A record of the auxiliary content items actually loaded and played on the console 70, along with the times and duration during which auxiliary content was played, or any other information obtained during playback of the auxiliary content, may be stored in a data storage area of the console 70, and is uploaded to the server at any suitable time, such as after a given piece of primary content has been played, after a given piece of auxiliary content has been viewed or partially viewed, or during a sign-off process from the network connection.

The viewed contents record, particularly the times and duration for which a given piece of auxiliary content was viewed, are used as a basis for assessing fees to advertisers who have provided the auxiliary content. Further the viewed contents record also enables customer information stored in the customer database 20 to be updated to include new information gained during viewing or interaction between the customer and the auxiliary content. For example, in the case of an interactive piece of auxiliary content, various questions may be asked of the user, or other user behavior monitored, which can then form part of the viewed contents record and be used for updating information on the customer in the customer database 20. In the case of non-interactive content, information of which advertisements have been viewed can be used to update customer information.

Figure 2:
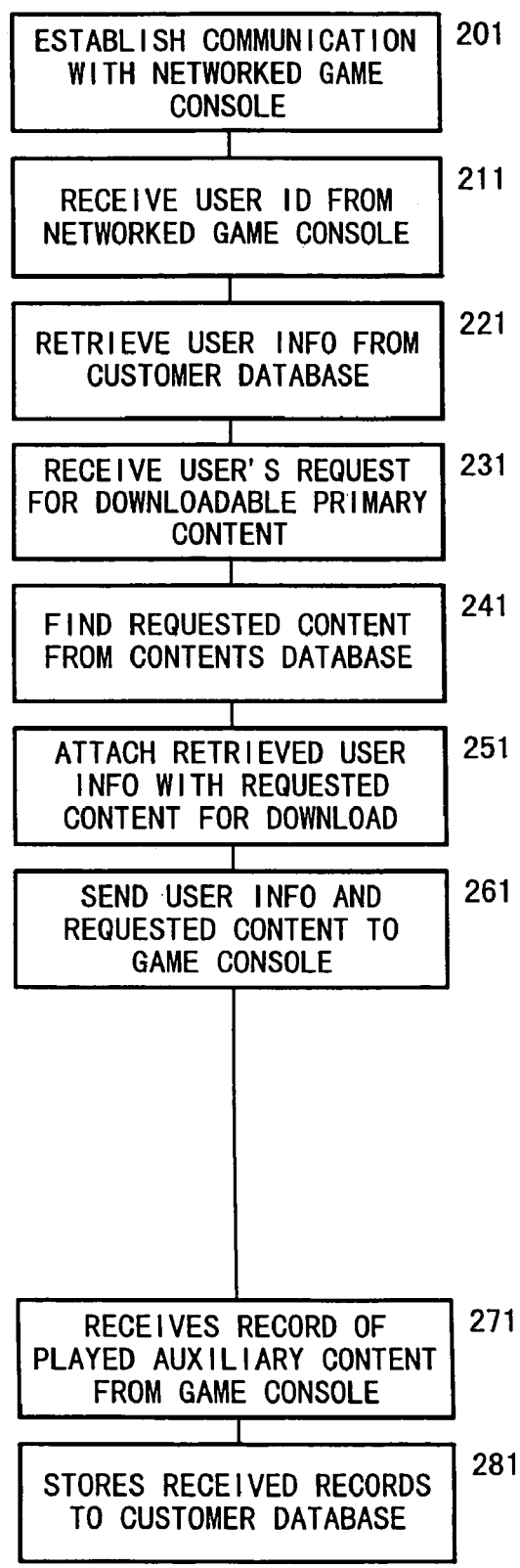
FIG. 2 is a flowchart which describes functions performed by the primary content server during communication with a networked game console.
Figure 3:
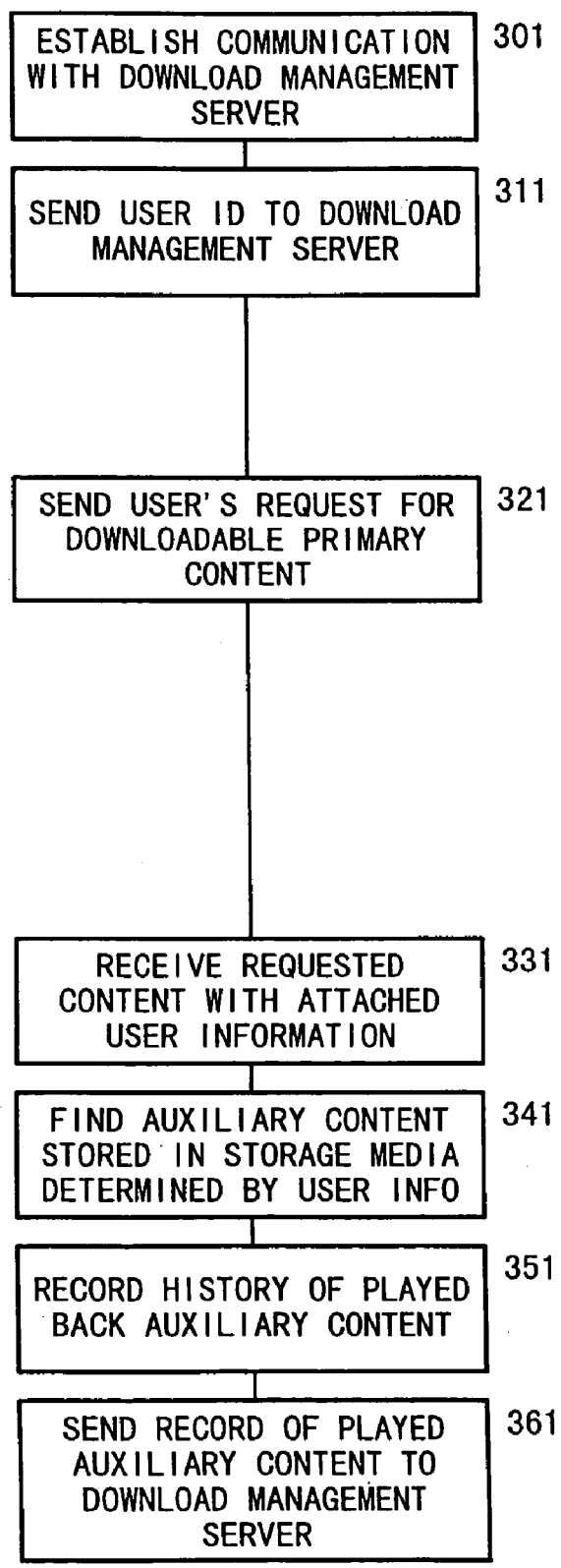
FIG. 3 is a flowchart which describes functions performed by a networked game console during communication with the primary content server.

FIG. 2 is a flowchart which describes sequential functions performed by the primary content server during communication with a networked game console. In addition, FIG. 3 shows a flowchart which describes functions performed by the networked game console during communication with the primary content server. Because the functions shown in FIGS. 2 and 3 occur in a mutually exchanged fashion, these functions shall be described together.

In Step 201 on the server side, the download service manager 10 receives a request to establish a communication link from the network game console 70. Similarly, in a Step 301 on the client or networked game console side, a request is sent to establish communication with the download service management server 10. As a result of these coordinated actions, a network socket connection according to known standards (e.g. IP/TCP) for bi-directional transmission of data packets is established between the management server 10 and the networked game console 70.

In Step 311, after the communication link has been established, a unique media ID indicating the media 80 installed in the game console 70 is sent to the download service management server 10. In the event of a first time user, the media ID is associated with the user and is thereafter used as a user identifier. In Step 211 on the server side, the management server 10 receives the media ID.

After receiving the unique media ID, in Step 221 on the server side, the management server 10 retrieves, via LAN 40, user information from the customer database 20. In the event that user information associated with the media ID (in the case of a new user) does not exist in the customer database 20, the user may be prompted to supply basic information for establishing initial user information for the customer database 20. This process shall be described in greater detail in FIG. 5.

At this point, in Step 321 on the game console side, a request is sent to the download management server 10 to retrieve downloadable primary content from the contents database 30. When the server receives the user's request for downloadable content in Step 231, the download management server 10, via LAN 40, finds and extracts the requested content from the contents database 30 in Step 241. At this point, in Step 251, the user information retrieved in Step 221 is attached to the requested primary content extracted in Step 241, and the user information together with the requested primary content are transmitted to the networked game console 70 in Step 261.

On the client side, in Step 331 the game console 70 receives the requested primary content along with the attached user information. In accordance with the user information, in Step 341 the game console 70 searches for and finds one or more auxiliary content items 415 (see FIG. 4) stored on the detachable storage media 80 which correspond with the user information. More specifically, a comparison is made between various data contained in the user information, which may also include information of the currently requested primary content, and trigger data 419 appended with each of the auxiliary contents 415, and for those items for which a match is found, the auxiliary contents 415 are extracted. As shall be explained in more detail in relation to FIG. 5, the user is given the option of overriding playback of the auxiliary content, however, assuming playback is authorized, the auxiliary content items 415 are loaded and executed for playback along with the primary content.

In Step 351, a record is stored in an internal memory (not shown) of the game console 70 of all the auxiliary content items which have actually been viewed by the customer. Such a record may comprise an identifier of the auxiliary content items which were viewed, and the duration for which an auxiliary content item was viewed if it was not played in its entirety.

In Step 361, the game console 70 sends the record established in Step 351 to the download management server 10, which in turn receives the playback record in Step 271. The transmittal of this record may be sent in any of various ways, for example as a comprehensive record at the end of user activity which is uploaded to the server during a sign-off procedure, or intermittently as each auxiliary content item is viewed. As discussed above, the playback record, which is stored in the customer database 20 in Step 281, provides valuable feedback information to auxiliary content providers, such as advertisers, as to whether the auxiliary content was effective for a given target audience, and may also be used as a basis for assessing fees to the auxiliary content providers.

Figure 4:
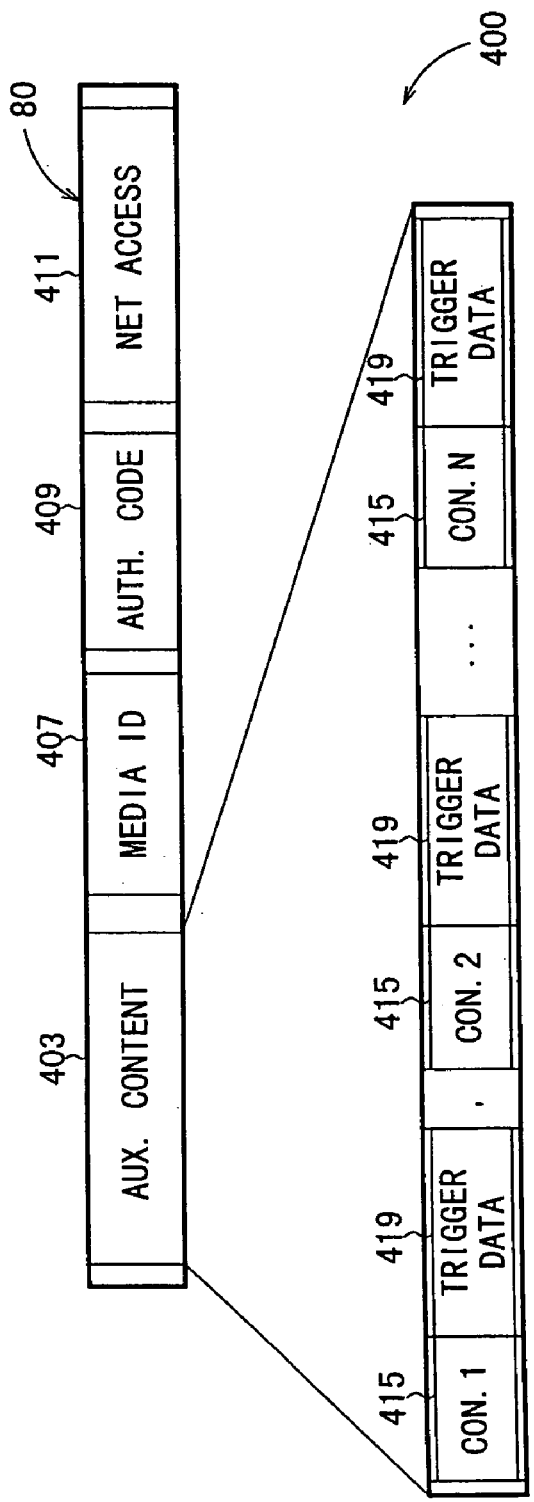
FIG. 4 is a diagram of data contents contained on a detachable storage medium inserted in the game console.

FIG. 4 is a diagram of data contents 400 contained on a detachable storage media 80 inserted in the game console 70. As shown schematically therein, the storage media 80 stores data comprising auxiliary content (AUX. CONTENT) 403 to be viewed by the user of the game console, wherein the auxiliary content 403 is made up of a plurality of content items 415 (Content 1, Content 2, . . . Content N) each with an appended set of trigger data 419. The storage media 80 further holds a unique MEDIA ID section 407, which serves for identifying the detachable storage media itself (such as an alphanumeric CD-ROM/DVD serial number) and which also establishes a user identifier for the user who utilizes the storage media 80 in the game console 70, and an authentication code (AUTH. CODE) 409 which is used for authenticating access to the download service manager 10. It is conceivable that the MEDIA ID and the authentication code could be the same, although preferably the functions of server access and media/customer identification are facilitated by separate codes. Alternatively, the MEDIA ID section 407 may comprise a software program which generates a unique user identifier in association with a prompt for user input of initial user data, such as the name, address, etc. of the user. It shall be understood that once the MEDIA ID 407 becomes associated with user information, the MEDIA ID 407 serves as a user identifier, so these terms may be used interchangeably hereinafter.

The USER ID 407 and AUTH. CODE 409 also serve jointly as an enabling key through which access to given primary content is authorized by the content server 10. More specifically, when the MEDIA ID 407 is uploaded to the server 10, on the basis of the MEDIA ID 407, the server 10 can determine which primary contents, from among multiple contents in the content database 30, are authorized for access to the user on the basis of the user identifier. Should such a media identifier not be present, or be deemed to be incorrect or outdated, access to the content server 10 is suspended. Thus, the correct storage media 80 must be present in the game console, and a correct and non-outdated media identifier must be determined, in order for access to the server 10 to be authorized. Another possibility is that the authorization code 409 provides access to a given server dedicated for downloading of specified primary content from among multiple contents in the contents database 30.

The storage media 80 additionally contains a NET ACCESS indicator 411 that the storage media 80 is intended for interaction with a server in a networked environment. The NET ACCESS indicator 411 may itself comprise network access software which enables the necessary network connection, or may simply comprise a flag indicating that network software residing in the game console 70 should be loaded and executed. In the latter case, the network software residing in the game console 70 may comprise a small program for establishing a minimal network connection to enable more versatile network software to be downloaded from the server and executed in the game console 70.

Figure 5:
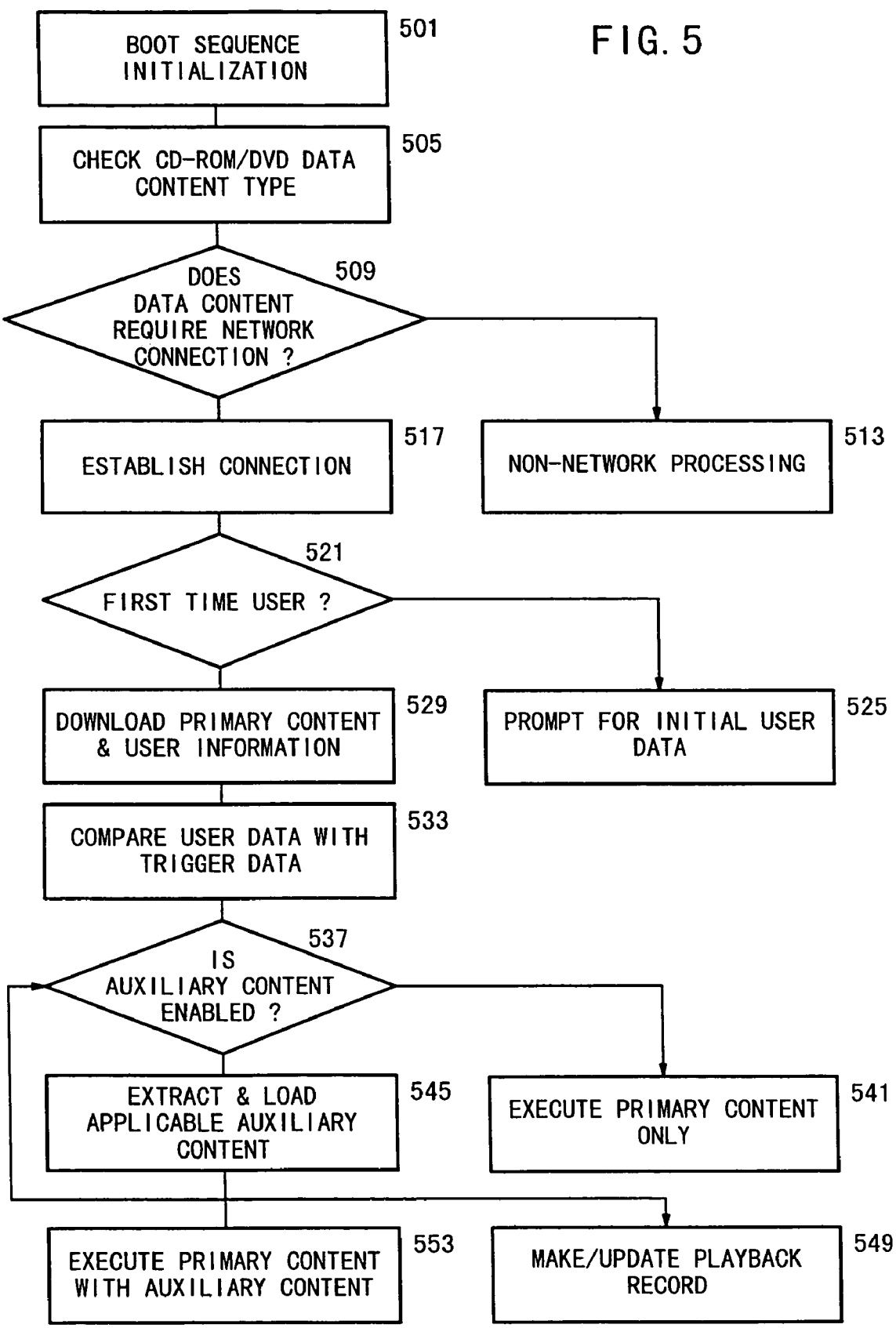
FIG. 5 is a process diagram describing the steps undertaken in the game console during access with the primary content server.

FIG. 5 is a process diagram describing steps undertaken in the networked game console 70 prior to and during a network connection with the primary content server 10.

In Step 501 when the game console is turned on, a standard boot sequence is initiated through an internal BIOS for enabling essential communications between peripheral devices and the like, whereby the system is initialized for operation by the user.

When a detachable media 80 such as a CD-ROM or DVD disc is inserted in the game console 70, in Step 505 the system scans the media 80 to determine whether the data content thereon is intended for operation in a networked environment. This is done by checking whether a NET ACCESS indicator 411, as described above, is present on the media 80 or not.

Next, in Step 509, if is it determined that the detachable media 80 does not contain a NET ACCESS indicator 411, i.e. that the media is a program intended for operation with the game console alone and not requiring a network connection, then in Step 513 the game console is operated in a normal non-networked mode. However, if the NET ACCESS indicator 411 is present, then a bi-directional network connection is established in Step 517 as was discussed above in relation to FIG. 2 and FIG. 3. In this case, the authorization code 409 on the detachable media 80 is used to enable the network connection.

In Step 521, it is determined in cooperation with the content server 10 whether or not the customer is a first time user or not. More specifically, upon receipt of the MEDIA ID 407, the content server 10 can determine whether this is the first time that the MEDIA ID 407 has been used to access the system 10, and if so, will issue a command to the game console 70 to prompt the user for initial user data as shown in Step 525. At this time, the server 10 may also establish and store a time/date log file for association with the MEDIA ID 407 which permits access to the server 10 with use of the detachable media 80 for a limited time period only.

In step 529, the primary content requested by the customer is downloaded into the networked game console 70 from the content server 10. As was described in relation to FIGS. 2 and 3, the desired primary content has attached thereto the user information which is associated with the user ID from the customer database 20. As for determining which primary content is authorized and hence downloadable to a given user, prior to step 529, the user may be presented with a menu option which displays only those primary content items, from among all items contained in the content database 30, that are authorized to the user for downloading and viewing, thereby facilitating selection by the user. While menu options may be provided as a function of a menu routine executed from the detachable storage media 80, on the server side the download management server 10 is capable of controlling which primary content is downloadable based on the MEDIA ID. In other words, the user cannot request primary content items which are not authorized for the MEDIA ID 407.

The routine proceeds next to step 533 for comparing the downloaded customer information with the trigger data 419 (see FIG. 4) for each of the auxiliary content items, to determine which auxiliary content items shall be loaded and queued for playback.

In step 537, the system checks to see whether the user has elected to permit playback of auxiliary content contained on the detachable storage media 80. The ability to optionally choose or disable playback of auxiliary content can be provided by means of a control button on the game console, and such ability is generally made constantly available to the user at any time before or during playback of the requested primary content.

If playback of auxiliary content is disabled, in Step 541 the primary content only is executed by the game console 70 for viewing by the user. However, assuming the customer permits playback of auxiliary content, the routine proceeds to step 545 wherein the applicable auxiliary content items 415 determined in Step 533 are loaded and queued for playback.

Upon loading of an auxiliary content item, in Step 549 the game console 70 makes a record in an internal storage area (not shown) that a given auxiliary content item has been readied for viewing by the customer, and upon execution of the auxiliary content, an on-board timer (also not shown) may be initiated to keep track of the time during which the auxiliary content items are played back. By means of a control loop back to Step 537, as shown in FIG. 5, the system continuously poles whether the user has enabled or disabled the auxiliary content. Assuming the user does not disable the auxiliary content during playback, it may be assumed that the auxiliary content item was viewed or interacted with in its entirety. However, should the user disable the auxiliary content during playback of a given auxiliary content item, the time at which the disablement occurred and the auxiliary content item being played back at that time are recorded. The playback record is also important in the event the user disables and then re-enables the auxiliary content, in which case the record provides an indication of which auxiliary content item was being viewed at the time of disablement, and thus allows the auxiliary content to be reinitiated at the content item where it last left off, in which case the playback record is updated.

Then roughly simultaneously with Step 549, the auxiliary content is executed for playback along with the requested primary content in Step 553. It shall be understood that various modes for execution of auxiliary and primary content can be contemplated within the knowledge of persons skilled in the art. For example, the auxiliary content can be played back before the running of the primary content, so that the user is not permitted to view the primary content until after the auxiliary content has been viewed, or otherwise run its course, for example by interaction with the user in the case of interactive content. Alternatively, the auxiliary content can be presented alongside with the primary content, for example in a window, inset, banner or frame, while the primary content is also being executed. Interaction between primary and auxiliary content is also possible. For example, in the case where the primary content is an interactive game, the appearance of a character, scene or other data item in the primary content can be used to trigger actions in the auxiliary content.

Figure 6:
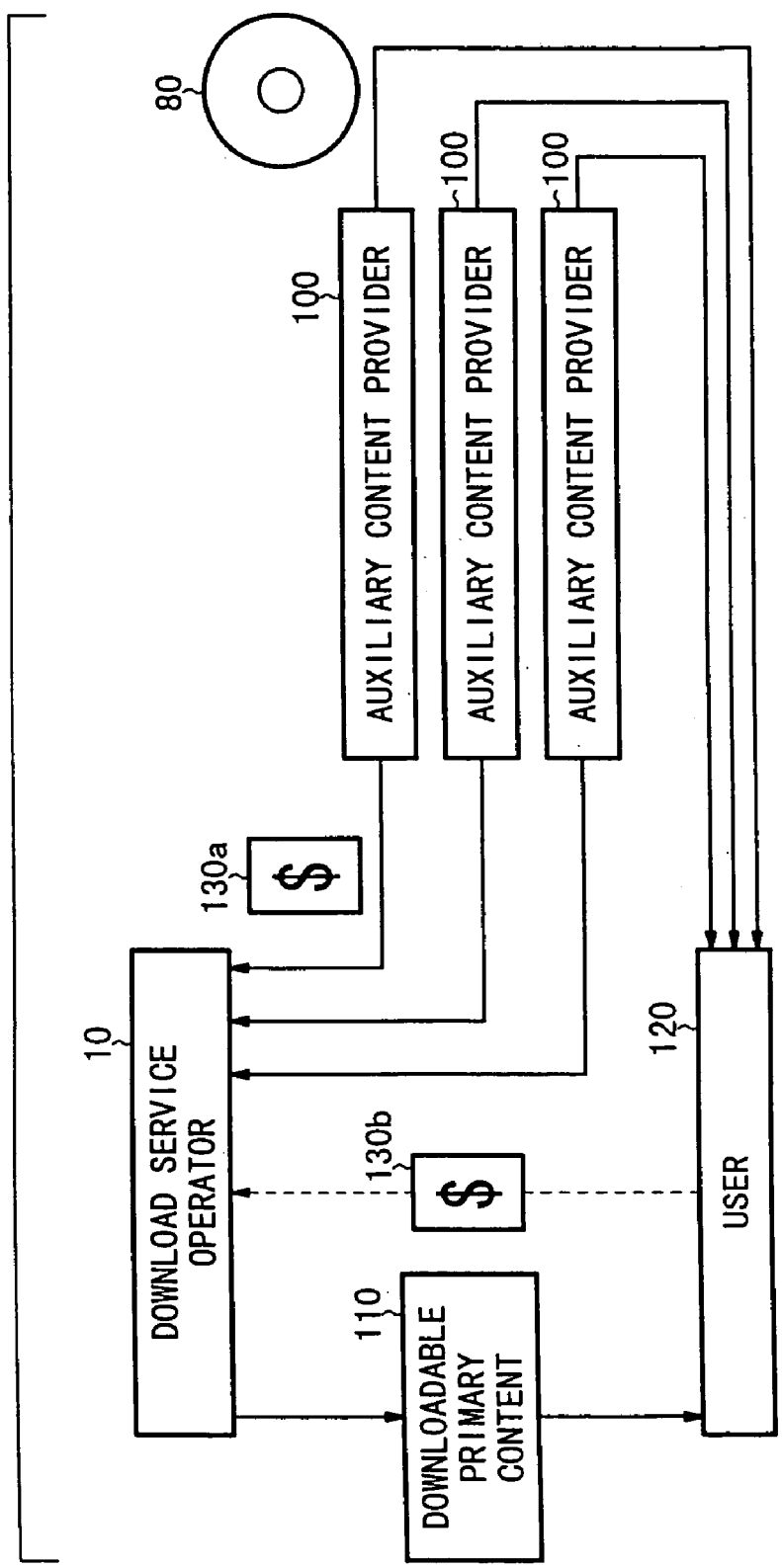
FIG. 6 is a diagram describing an exemplary business model implemented according to the teachings of the present invention.

FIG. 6 is a diagram describing an exemplary business model implemented according to the teachings of the present invention. The basic business model supposes two conditions. First, that the downloadable primary content 110 from the contents database 30 comprises a popular interactive game, movie, music or any other digital content worth paying for. Secondly, the content items stored on the detachable storage media 80 are typically advertisements from various auxiliary content providers 100 who are typically commercial companies or the like. In this case, if the user 120 elects to view the auxiliary content provided on the detachable storage media 80 along with the primary content 110, the fee 130a for the downloadable primary content 110 can be paid to the download service operator 10 by the auxiliary content provider 100.

Alternatively (as indicated by the dashed line in FIG. 6), if the user 120 decides to skip the auxiliary content, as described in Step 537 of FIG. 5, a fee 103b to the download service operator 10 for the primary content 110 will be charged to the user. Thus, the user 120 does not have to pay a fee to the download service operator 10 as long as the user 120 views the customized auxiliary content (triggered by the user's personal information) contained on the storage media 80.

Based on the playback record which is created in Step 549 of FIG. 5 and uploaded to the download service provider 10, the download service operator 10 can collect fees both from the user 120 and/or auxiliary content providers 100 based on the amount of secondary content viewed by the user 120.

It is significant not only that the auxiliary content is provided through a detachable storage media 80, but also that the system enables a pairing or linkage between the auxiliary content on the storage media 80 and specified downloadable primary content 110, and wherein, by means of key data on the storage media, the storage media 80 provides the avenue of access to the primary content 110. In this manner, auxiliary content providers, typically advertisers, are able to direct the detachable media 80 to customers whose motivation will be to access valuable and popular primary media content, whereas the primary content provider, through the key, can additionally control access to primary content based on a specified time period during which the storage media 80 can be used.

Further, in addition to being motivated to use the detachable media 80 to access popular primary media content, customers may feel less reluctant to offer personal identifying information if the impression is that the information is being collected by, and maintained under the control of, a well known primary content provider, as opposed to lesser known advertisers.

The system can also enable a two-tiered method of advertising, wherein the download server operator 10 can require forced viewing of advertisements sent directly along with the primary content, whereas advertisements from auxiliary content providers 80 are provided on an optional basis to the user 120, thereby increasing the versatility of the system as an advertising method.

It shall be understood that various modifications will be apparent and can be readily made by persons skilled in the art without departing from the scope and spirit of the present invention. Accordingly, the following claims shall not be limited by the descriptions or illustrations set forth herein, but shall be construed to cover with reasonable breadth all features which may be envisaged as equivalents by those skilled in the art.

What is claimed is:

1. A system for providing access to primary media content in digital form, comprising:
   a server network comprising a download management server, a customer database storing user information, and a primary content database storing primary media content;
   a client console connectable for establishing a communications link through a bi-directional communications network to said download management server, said client console generating a user identifier; and
   a detachable storage media installable in said client console, said detachable storage media having a data structure thereon comprising a plurality of auxiliary media content items, and a plurality of trigger data items logically associated, respectively, with each of said auxiliary media content items, the plurality of auxiliary media content items being comprised of advertisements,
   wherein said user identifier is uploaded to said download management server to enable access to specified content in said primary media content database, and said user information is downloaded into said client console, said client console comparing said downloaded user information with a trigger data item for each of said auxiliary media content items to determine which of said auxiliary media content items are to be loaded and queued for playback.

2. The system according to claim 1, wherein said user identifier comprises a media ID identifying said detachable storage media.

3. The system according to claim 1, wherein said specified content comprises a portion of an overall set of primary contents stored in said contents database, and wherein said user identifier serves to limit access to said specified content only.

4. The system according to claim 1, wherein said data structure comprises an authentication code for authenticating access to the download management server.

5. The system according to claim 4, wherein said specified content comprises a portion of an overall set of primary contents stored in said contents database, and wherein said authentication code authenticates access to the download management server which is responsible for providing access to said specified content.

6. The system according to claim 1, wherein said data structure further comprises a data indicator indicating that said detachable storage media is operable through connection to said bi-directional communications network.

7. The system according to claim 6, wherein said data indicator comprises one of a program for providing network access and a code which causes execution of a program stored in said client console for providing network access.

8. The system according to claim 1, wherein said client console further comprises a local fixed storage device disposed internally or externally of said client console, wherein said specified primary media content is downloaded onto said fixed storage device.

9. A method for delivery of primary media content in digital form through a bi-directional communications network, together with auxiliary media content comprised of advertisements stored on a detachable storage media, comprising the steps of:
   establishing a communications link between a client console and a download management server through said bi-directional communications network, said client console having said detachable storage media detachably installed therein;
   transmitting user identifier data contained on a local storage media and a request for primary media content to said download management server, in order to retrieve said primary media content from a contents database and to retrieve user information from a customer database;
   downloading into said local storage media of said client console from said download management server said primary media content and said user information;

accessing said auxiliary media content comprised of advertisements stored on said detachable storage media on the basis of said user information retrieved from said customer database, the accessing of said auxiliary media content including comparing said downloaded user information with trigger data for each item of auxiliary media content to determine which auxiliary media content items are to be loaded and queued for playback;

selectively overriding playback of said auxiliary content, for enabling viewing of solely the primary media content downloaded from said download management server;

storing a record of the auxiliary content viewed using said client console; and uploading said record to said download management server.

10. The method according to claim 9, wherein said user identifier data comprises a media ID identifying said detachable storage media and said local storage media further contains an authentication code which enables access to said download management server, further comprising the step of receiving said media ID and said authentication code in said download management server, wherein one of said authentication code and said media ID serves to limit access to specified content only from among said primary media content.

11. The method according to claim 9, wherein said step of downloading into said client console from said download management server comprises storing said primary media content on a local fixed storage device disposed internally or externally of said client console.

12. A method of operating a client console having a detachable storage media installable therein while connecting with a download management server through a bi-directional communications network, comprising the steps of:

determining whether said detachable storage media requires connection to said bi-directional communications network for operation in said client console, said detachable storage media having auxiliary media content comprised of advertisements stored thereon;

establishing a communications link between a client console and the download management server through said bi-directional communications network, if it is determined that the detachable storage media requires connection to said bi-directional communications network;

transmitting user identifier data contained on said detachable storage media and a request for primary media content to said download management server;

downloading requested primary media content and user information from said download management server;

comparing said user information with trigger data for each auxiliary media content item stored on said detachable storage media to determine which auxiliary media content items are to be loaded and queued for playback;

determining whether a control function of said client console is enabled for permitting viewing of said auxiliary media content;

extracting and loading said auxiliary media content item for which the associated trigger data matches said user information, if it is determined that said control function is enabled;

executing playback of said auxiliary media content item;

creating a record indicating playback of at least one auxiliary media content item, if said auxiliary media content item is played using said client console; and uploading said record to said download management server.

13. The method according to claim 12, wherein said user identifier data comprises a media ID identifying said detachable storage media, and further comprising the steps of prompting the user for said user information and associating said user information with said media ID.

14. The method according to claim 12, further comprising a step of continuously polling to determine whether the user overrides playback of said auxiliary media content during execution of said primary content.

15. The method according to claim 14, wherein said step of creating a record comprises updating said record if said control function of said client console is first disabled and then enabled.

16. The method according to claim 15, wherein said step of uploading said record to said download management server occurs after playback of each item of auxiliary media content.

17. The method according to claim 15, wherein said step of uploading said record to said download management server occurs after playback of an item of primary media content.

18. The method according to claim 15, wherein said step of uploading said record to said download management server occurs during a log off procedure to disconnect said client console from said download management server.

19. A console used in conjunction with a storage media having a data structure thereon comprising trigger data corresponding to user information, a plurality of auxiliary media content items each associated with said trigger data, said plurality of auxiliary media content items being comprised of advertisements, a media ID for identifying said storage media, and an authentication code for authenticating access to a server via a network, wherein said console comprises:

logic for reading said authentication code and said media ID of said storage media installed in said console;

logic for sending said authentication code and/or said media ID to said server via said network;

logic for receiving primary media content and user information from said server and comparing said user information with trigger data for each auxiliary media content item to determine which auxiliary media content item is to be loaded and queued for playback; and logic for outputting said auxiliary media content item.

20. A console according to claim 19, wherein network access software for establishing connection to said network is stored in said storage media or a memory of said console.

21. A console according to claim 19, wherein said console further comprises means for enabling said user to decide whether or not to view said auxiliary media content item.

22. A console according to claim 19, wherein said console further comprises means for sending a record of said outputted auxiliary media content item to said server via said network.

23. A method of assessing a fee for auxiliary content comprised of advertisements stored on a detachable storage media to an auxiliary content provider comprising the steps of:

establishing a communications link between a client console and a server through a communications network, said client console having said storage media detachably installed therein;

transmitting user identifier data contained on said detachable storage media to said server, in order to retrieve user information from a customer database;

downloading said user information from said customer database of said server to said client console;

accessing said auxiliary content stored on said detachable storage media on the basis of said user information retrieved from said customer database, the accessing of said auxiliary content including comparing said user information with trigger data for each auxiliary media content item to determine which auxiliary media content items are to be loaded and queued for playback;

storing a record indicating playback of said auxiliary content viewed using said client console;

uploading said playback record to said server; and assessing a fee to said auxiliary content provider based upon said playback records accumulated by said server.

24. The method according to claim 23, wherein said user identifier data comprises a media ID for identifying said detachable storage media and said detachable storage media further contains an authentication code for enabling access to said server.

25. The method according to claim 23, further comprising the step of selectively overriding playback of said auxiliary content, for enabling viewing of solely primary media content stored on a content database of said server.

26. A method of assessing a fee for auxiliary content comprised of advertisements stored on a detachable storage media to an auxiliary content provider, using a client console having said detachable storage media installable therein while connecting with a download management server through a bi-directional communications network, said method comprising the steps of:

determining whether said detachable storage media requires connection to said bi-directional communications network for operation in said client console;

establishing a communications link between said client console and said download management server, if it is determined that said detachable storage media requires connection to said bi-directional communications network;

transmitting user identifier data to said download management server;

downloading requested user information from said download management server to said client console;

determining whether a control function of said client console is enabled for permitting viewing of said auxiliary content;

extracting and loading an auxiliary content item, if it is determined that said control function is enabled, said auxiliary content item making up said auxiliary content, said extracting and loading of said auxiliary content item including comparing said downloaded user information with trigger data for each auxiliary content item to determine which auxiliary content item is to be loaded and queued for playback;

executing playback of said auxiliary content item;

creating a record indicating playback of said auxiliary content item, if said auxiliary content item is played using said client console;

uploading said playback record to said download management server; and assessing a fee to said auxiliary content provider based upon said playback records accumulated by said download management server.

27. The method according to claim 26, further comprising the step of continuously polling to determine whether a user overrides playback of said auxiliary content during execution of primary content stored on a content database of said download management server.

28. The method according to claim 27, wherein said step of creating a record comprises the step of updating said playback record if said control function of said client console is first disabled and then enabled.

29. The method according to claim 28, wherein said step of uploading said playback record to said download management server occurs after or during playback of each item of said primary content.

30. The method according to claim 28, wherein said step of uploading said record to said download management server occurs after or during playback of each item of said auxiliary content.

31. The method according to claim 28, wherein said step of uploading record to said server occurs during a log off procedure to disconnect said client console from said download management server.

32. The method according to claim 26, wherein said user identifier data comprises a media ID for identifying said detachable storage media, and further comprising the steps of prompting the user for said user information and associating said user information with said media ID.

* * * * *

UNITED STATES PATENT AND TRADEMARK OFFICE
CERTIFICATE OF CORRECTION

PATENT NO. : 7,047,302 B1  Page 1 of 1
APPLICATION NO. : 09/452811
DATED : May 16, 2006
INVENTOR(S) : Chatani et al.

It is certified that error appears in the above-identified patent and that said Letters Patent is hereby corrected as shown below:

Title page "(73) Assignee:"

Delete
" Sony Corporation Entertainment America Inc."

the correct Assignee name is:

--Sony Computer Entertainment America Inc.--

Signed and Sealed this

Twenty-seventh Day of March, 2007

JON W. DUDAS
*Director of the United States Patent and Trademark Office*